United States Patent
Beukema

(10) Patent No.: US 10,833,896 B1
(45) Date of Patent: Nov. 10, 2020

(54) INTEGRATED SWITCHED-CAPACITOR-BASED ANALOG FEED-FORWARD EQUALIZER CIRCUITS

(71) Applicants: International Business Machines Corporation, Armonk, NY (US); Global Foundries Inc., Grand Cayman (KY)

(72) Inventor: Troy James Beukema, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/513,130

(22) Filed: Jul. 16, 2019

(51) Int. Cl.
    *H04L 25/03* (2006.01)
    *H04L 25/02* (2006.01)

(52) U.S. Cl.
    CPC .... *H04L 25/03878* (2013.01); *H04L 25/0264* (2013.01); *H04L 25/03114* (2013.01)

(58) Field of Classification Search
    CPC .......... H03M 1/38; H03M 1/40; H03M 1/468; H04L 7/027; H04L 25/01; H04L 25/03; H04L 25/0264; H04L 25/03114; H04L 25/03878; H04L 25/03885; H04L 27/01; H04L 27/06
    USPC ......... 327/100, 147; 365/149, 194; 375/219, 375/229, 230, 233, 236
    See application file for complete search history.

(56) References Cited

U.S. PATENT DOCUMENTS

| | | | |
|---|---|---|---|
| 7,009,549 B1 | 3/2006 | Corsi | |
| 7,279,940 B1 | 10/2007 | Min | |
| 7,346,645 B2 | 3/2008 | Reynolds | |
| 9,088,449 B1 | 7/2015 | Chang et al. | |
| 9,385,898 B2 | 7/2016 | Kizer et al. | |
| 10,033,555 B2 | 7/2018 | Schell | |

(Continued)

FOREIGN PATENT DOCUMENTS

WO    2017053119 A1    3/2017

OTHER PUBLICATIONS

Naveen Kadayinti and Dinesh Sharma "Sense Amplifier Comparator with Offset Correction for Decision Feedback Equalization Based Receivers" Department of Electrical Engineering, Indian Institute of Technology Bombay, Powai, Mumbai 400076, India. Feb. 3, 2017.

(Continued)

*Primary Examiner* — Shawkat M Ali
(74) *Attorney, Agent, or Firm* — Harrington & Smith

(57) ABSTRACT

An apparatus includes an FFE circuit, including a clock generator creating multiple sub-rate phases of an input clock, and a multi-phase sampler responsive to a data signal and to the multiple sub-rate phases generated by the clock generator. The sampler is configured to sample the data signal and to generate held sample outputs corresponding to the multiple sub-rate phases. A SC equalization circuit in the FFE circuit has two states and is responsive to inputs from the multi-phase sampler output and the clock generator. The SC equalization circuit is configured to form outputs using the two states. A variable gain output stage in the FFE circuit is responsive to the outputs from the SC equalization circuit and is responsive to gain control signal(s) to provide variable gains to corresponding outputs of the SC equalization circuit to form equalized outputs based on the data signal.

17 Claims, 12 Drawing Sheets

(56) References Cited

U.S. PATENT DOCUMENTS

| | | | | |
|---|---|---|---|---|
| 2013/0336378 A1* | 12/2013 | Agrawal | ................ | H03K 5/135 |
| | | | | 375/233 |
| 2014/0355663 A1* | 12/2014 | Kizer | ................ | H04L 25/03885 |
| | | | | 375/236 |
| 2016/0105195 A1* | 4/2016 | Mulder | .................. | G11C 27/02 |
| | | | | 341/122 |

OTHER PUBLICATIONS

Ankur Agrawal, John F. Bulzacchelli, Timothey O. Dickson, Yong Liu, Jose A. Tierno and Daniel J. Friedman "A 19-Gb/s Serial Link Receiver with Both 4-Tap FFE and 5-Tap DFE Functions in 45-nm SOI CMOS" IEEE Journal of Solid-State Circuits, vol. 47, No. 12. Dec. 2012.

\* cited by examiner

FIG. 2A. Digital Receiver with CTE/FFE/DFE   FIG. 2B. Analog Receiver with CTE/DFE M2 metal cap 1umx1um (~1fF)

M1 metal cap 1umx1um (~1fF)

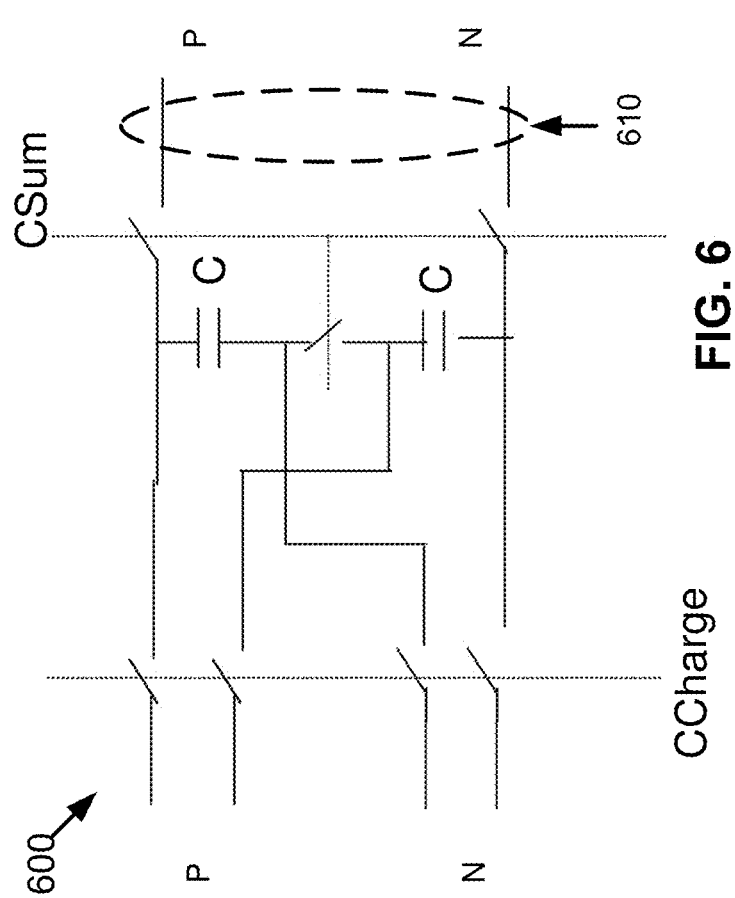
FIG. 5A. Differential Switched Cap   FIG. 5B. Single-Ended Switched Cap
FIG. 5
FIG. 6

INTEGRATED SWITCHED-CAPACITOR-BASED ANALOG FEED-FORWARD EQUALIZER CIRCUITS

BACKGROUND

This invention relates generally to circuits and, more specifically, relates to integrated switched-capacitor-based analog feed-forward equalizer circuits.

This section is intended to provide a background or context to the invention disclosed below. Abbreviations that may be found in the specification and/or the drawing figures are defined below, at the beginning of the detailed description section.

High speed data transceivers are a key component of modern information technology systems, such as internet switch/routers and computer systems. To enable the performance of these systems to continue to grow, the data transmission rate of the transceivers has increased in recent years to 25 Gb/s and higher. In most high data rate line receiver applications, the dispersive effects of the transmission media, which is typically realized as some form of a differential transmission line, require line equalization to permit reliable recovery of the transmitted data. Approaches to realize line equalizer structures within the high speed data transceivers are desired.

SUMMARY

This section is meant to be exemplary and not meant to be limiting.

An apparatus a feed-forward equalizer circuit. The feed-forward equalizer circuit includes a clock generator creating multiple sub-rate phases of an input clock, and a multi-phase sampler responsive to a data signal and to the multiple sub-rate phases generated by the clock generator. The multi-phase sampler is configured to sample the data signal and to generate held sample outputs corresponding to the multiple sub-rate phases. The feed-forward equalizer circuit includes a switched-capacitor equalization circuit having two states and responsive to inputs from the multi-phase sampler output and the sub-rate clock generator. The two states are charge and sum. The switched-capacitor equalization circuit is configured to form outputs using the two states. The feed-forward equalizer circuit includes a variable gain output stage responsive to the outputs from the switched capacitor equalization circuit and responsive to at least one gain control signal to provide variable gains to corresponding outputs of the switched-capacitor equalization circuit to form equalized outputs based on the data signal.

BRIEF DESCRIPTION OF THE SEVERAL VIEWS OF THE DRAWINGS

FIG. 5 is split into FIG. 5A, illustrating a differential switched capacitor (cap), and FIG. 5B, illustrating a single-ended switched cap, in accordance with exemplary embodiments;

FIG. 6 illustrates a switched-cap cell with voltage boost, in accordance with an exemplary embodiment;

DETAILED DESCRIPTION

Figure 1:
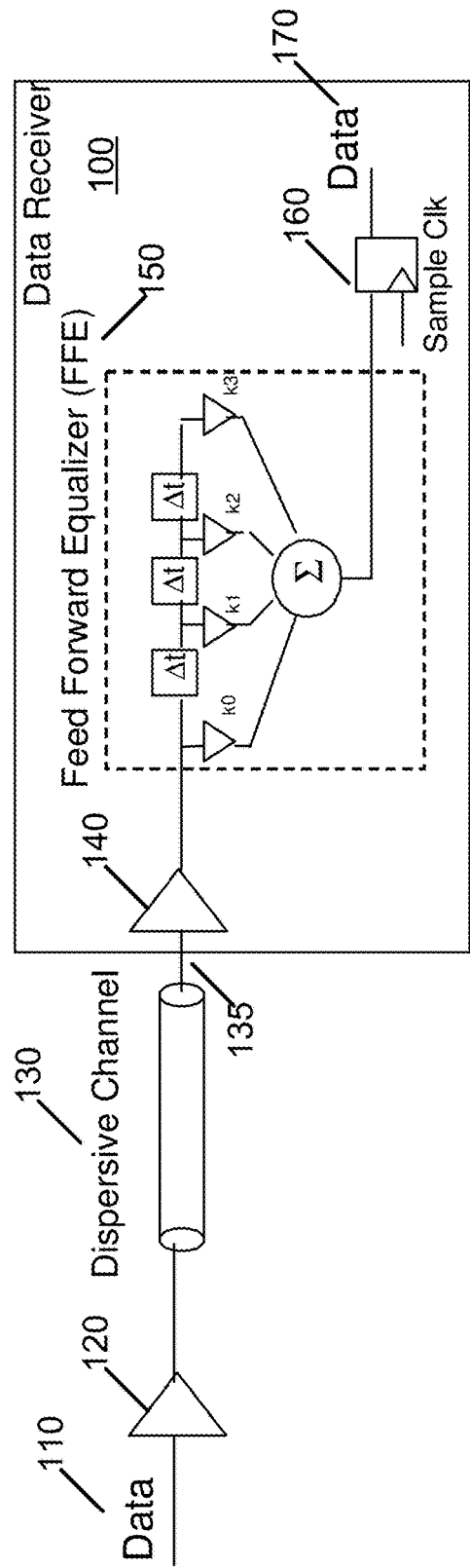
FIG. 1 is an illustration data receiver with a feed-forward line equalizer.

The following abbreviations that may be found in the specification and/or the drawing figures are defined as follows:

~ about
ADC analog-digital conversion
C (with number) capacitor and number of the cap in the circuit
cap capacitor
clk clock
CML current mode logic
CMOS complementary metal-oxide-semiconductor
CTE continuous time equalizer
DC direct current
DFE decision-feedback equalization
FFE feed forward equalizer or feed forward equalization
Gb/s gigabyte per second
IC integrated circuit
ISI inter-symbol interference
NSF N-type source-follower
MOSCAP Metal-Oxide-Semiconductor capacitor
m/s master/slave
P (with number) input or output connection
Pol polarity
PSF P-type source-follower
R reset
R (with number) resistor and number of the resistor in the circuit
Rx receiver
SC switched capacitor
T transistor
UI unit interval
VNCAPS metal vertical natural capacitors
vs versus The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The following document is divided into sections, for ease of reference.

I. Overview of the Technological Area

This section provides an overview of the technological area in which the exemplary embodiments occur. As described above, in most high-data-rate line receiver applications, the dispersive effects of the transmission media, which is typically realized as some form of a differential transmission line, require line equalization to permit reliable recovery of the transmitted data. Line equalization in serial transceivers may typically be realized in part or in full using well-known feed-forward equalizer structures at a transmitter and/or receiver, as shown in FIG. 1.

FIG. 1 shows a data receiver 100 that receives data 110 after amplification via amplifier 120 and passing through a dispersive channel 130. The resultant received signal 135 is amplified by amplifier 140, and the receiver feed-forward equalizer (FFE) 150 combines (via summer Σ) weighted (via weights k0, k1, k2, and k3) and time-delayed versions (via time delays Δt) of the signal together to minimize the inter-symbol interference (ISI) arising from line dispersion on a data signal at sample time. The latch 160 samples the signal based on the sample clock (clk) and outputs the data 170.

Figure 2:
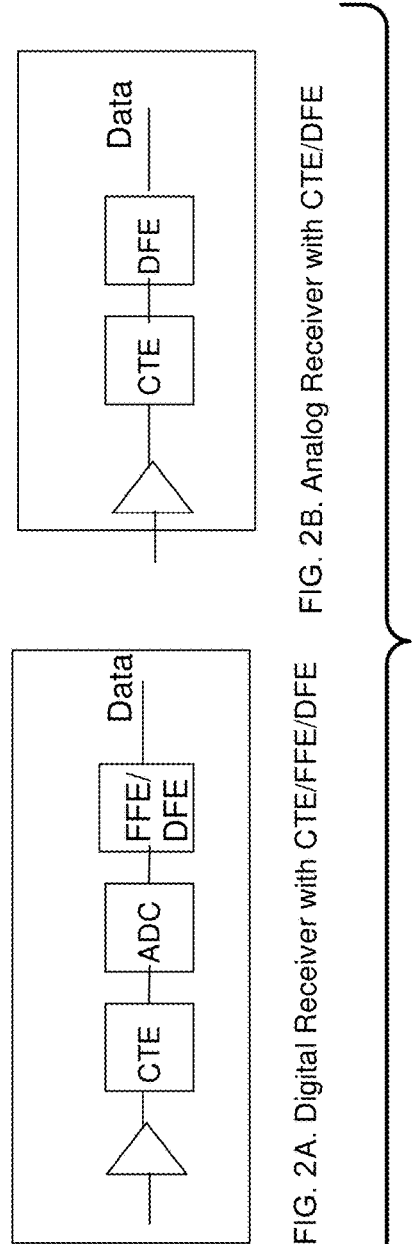
FIG. 2 is split into FIG. 2A, showing a digital receiver with CTE/FFE/DFE, and into FIG. 2B, showing an analog receiver with CTE/DFE.

Common data receiver designs include analog receivers based on a continuous time equalizer (CTE, sometimes called a peaking amp) combined with DFE (decision-feedback equalization), and digital receivers based on ADC (analog-digital conversion) followed by digital FFE/DFE processing as illustrated in FIG. 2. FIG. 2 is split into FIG. 2A, showing a digital receiver with CTE/FFE/DFE, and into FIG. 2B, showing an analog receiver with CTE/DFE.

The disadvantage of analog CTE/DFE based receivers as in FIG. 2B is the high level of complexity required to realize a DFE function with multilevel modulation used in modern 50 Gb/s data rate systems, and inherent disadvantages of DFE such as error propagation. The disadvantage of digital receivers (as in FIG. 2A) is the potentially higher power required to realize the receive function due to power added by the ADC itself and the digital circuitry required to realize the equalization functions. In modern high-performance systems, a large number of data transceivers may be integrated onto a single integrated-circuit (IC) die. This imposes a requirement that the power and area of the circuitry used to realize the equalizer function be as small as possible. As a result, a data receiver using a power efficient analog FFE as illustrated in FIG. 1 may be preferable in many system designs.

Known solutions for receiver analog FFE are based on current-integrating summers. This type of structure has the possibility of degradation from non-linearities in current sources providing the summing current, and also can modulate effective gain of the FFE tap weights if there is clock jitter on the clocks driving the current integrator's resets. It is also hard to achieve deterministic weights in the current integrating FFE design since the tap weights are highly dependent on device specific parameters such as transconductance, which can vary across temperature and voltage operating conditions. A second known solution for analog FFE is based on a transversal filter built with analog delay lines. This type of structure is very difficult to realize practically, due to the difficulty of realizing variable analog delays and linear summing circuits with wide bandwidth in modern deep submicron CMOS technology, and the difficulty of tuning the delays to match variable input data rates.

II. Exemplary Embodiments

The exemplary embodiments herein include apparatus and methods to realize power- and area-efficient feed-forward equalization circuits for application in, e.g., high data rate receiver integrated circuits.

The exemplary embodiments describe a switched-capacitor based data receiver FFE equalizer optimized for practical realization in, e.g., modern CMOS IC technology. A received data signal is first sampled at a rate slower than the incoming signal symbol rate with an arrangement of parallel samplers equal in number to the sub-sample rate. In a described embodiment, the sample rate is eight times slower than the incoming signal symbol rate, although implementation is not limited to eight times slower. The sub-rate samples drive an arrangement of two-state switched-capacitor (SC) circuits. The SC circuits comprise passgate switches configured for a first "charge" state during a nominal first one-half (½) of a sub-rate sample period, followed by a "sum" state during the nominal second ½ of a sub-rate sample period. During the "sum" state, SC circuits corresponding to different delays with individually programmable capacitance weights are connected together to form a weighted sum, or analog dot product, of delayed versions of the sampled signal, to realize the feed-forward equalization function. The SC circuits are arranged to enable accurate "0" (zero) tap weight configuration to cancel out parasitic effects of the switched capacitor structures. The SC circuit can also be arranged to provide an inherent voltage amplification of the signal if desired.

Figure 3:
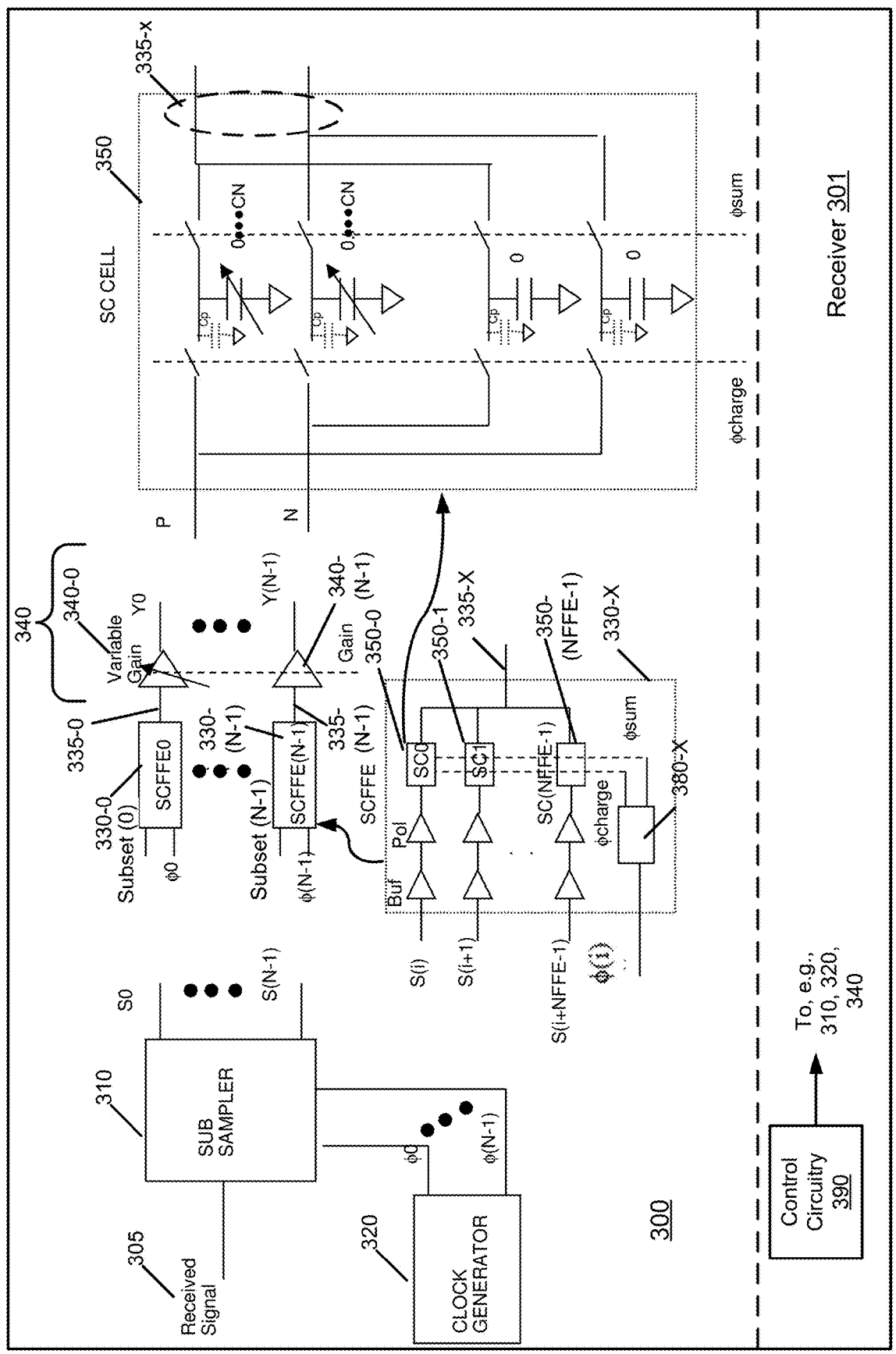
FIG. 3 illustrates a receiver comprising an integrated switched-capacitor-based analog feed-forward equalizer circuit suitable for high data rate applications in accordance with an exemplary embodiment.

A high level block diagram of an exemplary embodiment is illustrated in FIG. 3, which illustrates a receiver 301 comprising an integrated switched-capacitor-based analog feed-forward equalizer circuit 300 in accordance with an exemplary embodiment. The receiver 301 is normally integrated into a transceiver (not shown) which includes, for instance, a PLL (phase locked loop for clock generation) and transmitter functions. This transceiver in turn is used to interface an IC (integrated circuit) such as a network switch/router or I/O (input/output) bridge chip to other chips through dispersive pc board or backplane interconnect channels.

This FFE circuit 300 is suitable for use in high data rate applications. In this diagram, a received signal 305 is first sub-sampled (by sub-sampler 310) at N uniform clock phases (created by clock generator 320 and listed as 40 through 4(N−1)), where the subsampling ratio N is selected to provide adequate charge and sum time for the switched-capacitor summing cells. As an example, for a 24 Gbaud system, if N is selected as eight, the sub-sample rate is 3 GHz. This results in approximately 320 ns of available time to sum and charge the switched-capacitor cell. Key to this in an exemplary embodiment is the use of a master-slave sub-sampler, so the output of the sub-sampler stays constant for the full subsample period. That is, a multi-phase master-slave sampler is configured to sample the data signal and to generate sample outputs equal in duration to a sub-rate sample period. This feature enables required voltages to be present at the output of the sub-sampler 310 to form weighted sums of delayed samples to realize the desired feed-forward equalization function without the need for further sample and hold stages in some embodiments.

After subsampling, the N output signal values S0 to S(N−1) are distributed to N parallel SCFFE units 330, shown as 330-0 through 330-(N−1). Each SCFFE unit 330-X accepts a length-NFFE subset (where NFFE is a length, also called span, of the FFE) of the N subsampled signal values from the sub-sampler 310. On FIG. 3, the subset for SCFFE0 is shown as Subset (0) and the subset for SCFFE(N−1) is shown as Subset (N−1), and equations for these are described in reference to FIG. 4A. The subset of N subsample signal values are buffered (Buf) and then assigned an optional polarity (Pol) by a polarizer prior to being input to a corresponding one of the SC cells 350. The polarity Pol makes a configurable sign change as described in more detail below. The SCFFE 330-X forms a weighted sum of these signals at the SCFFE output 335-X. Each SCFFE output 335 (from 335-0 to 335-(N−1)) is then buffered by a corresponding variable-gain amplifier 340-0 to 340-(N−1) in a variable gain output stage 340 to provide a conditioned amplitude level at the equalized outputs Y (from Y0 to Y(N−1)) of the FFE 300. This variable gain output stage 340 is responsive to at least one gain control signal (shown as "Gain") and is used to maintain a desired signal level, as the SCFFE cell tap weights are varied according to the channel being equalized. In particular, as more equalization is applied in the SCFFE 300, the amplitude of the output signal will get smaller and requires amplification prior to use. In an exemplary embodiment, the gain of the variable gain amplifier will vary from 0 dB to 12 dB, corresponding to a linear gain from 1 to 4.

In more detail, regarding having a variable gain stage at the output of FFE, operation of this is as follows. For different channels, a 5-tap (as an example) FFE will converge to different tap weights for optimal equalization/performance. It is noted that there is an external control method, not defined herein, which is responsible for configuring the best equalization setting using methods known in the art. Herein, instead, we show apparatus capable of realizing the 1-1-E function and a needed (example) VGA function to boost signal level back up after applying FFE, if necessary based on FFE tap configuration. The external control method is normally realized in an embodiment as a digital RLM (register logic macro) which examines the waveform information after the waveform has passed through the FFE for both amplitude and intersymbol interference levels, and adjusts the tap values and AGC gain using methods well known in the art to lower intersymbol interference and configure appropriate amplitude for the CMOS circuits. In more detail, when every UI of data is overlapped on top of each other, the method will make an eye diagram which shows edge crossing variation (e.g., "fuzz") to indicate horizontal ISI amount and also shows vertical amplitude variation (e.g., "fuzz") to indicate vertical ISI amount. FFE tap values will converge to the setting either best minimizing the horizontal edge crossing fuzz (horizontal ISI) or best minimizing the vertical amplitude fuzz (vertical ISI) depending on the chosen FFE algorithm.

Different FFE tap weights mean different amount of de-emphasis applied on the data signal 305, hence different DC gain is applied to data signal 305. A more negative FFE tap means more de-emphasis and means more attenuation on a low frequency data signal (e.g., low DC gain). For an equalized data signal to be correctly captured by a sampling latch, the latch requires a certain DC signal amplitude, therefore a variable gain amplifier (VGA) 340-0 through 340-(N−1) is used in between the sampling latch (not shown in FIG. 3) and corresponding FFE 330-0 through 330-(N−1). Each VGA will dynamically adjust its gain to amplify the FFE output signal to be just enough for latch to work optimally (e.g., not too much to cause a linearity problem, not too small to cause a signal noise ratio concern). The net outcome is that VGA is useful and will work hand-in-hand with FFE because of DC gain implication due to FFE taps.

Each of the N SCFFE units 330 accepts a nominal 50% duty cycle input clock which is used to operate the switched capacitor cells (SC cells 350). The corresponding input clock $\phi(i)$ drives (via reference 380-X) switched-capacitor circuits with switches configured for "charge" state ($\phi$charge) during the nominal first ½ of a sub-sample period. Following the "charge" state, the switched-capacitor circuit(s) are disconnected from the input and connected to a common output node 335-x for the nominal second half of a sample period, referred to as a "sum" state ($\phi$sum). At the end of the "sum" state, the output signal is buffered by a variable-gain stage 340 (via variable gain amplifiers 340-0 through 340-(N−1)) and output (as Y0 through Y(N−1)) to subsequent processing stages (not shown) in receiver 301, such as a data slicer. Reference 380-X is a clock phase generator. It is responsible for generating the clock waveforms in FIG. 10 (illustrating break charge slightly before make sum).

The SC cell 350 in an exemplary embodiment is constructed using the differential circuit topology illustrated in FIG. 3. Note that the top two sets of capacitors are variable, having capacitances from 0 (zero) to CN, where CN may vary as a function of the FFE tap index. This is explained in more detail relative to FIGS. 4C-4E. The switched-cap circuit topology replicates the variable-capacitor structure used on the main path and fixes its weight at 0 (zero). When cross-connected to the main path output as shown in FIG. 3 (P to N and N to P), this circuit topology results in cancellation of the impact of parasitic capacitance of the switched capacitors on the output sum, so that programming a "0" weight on the main SC path results in a 0 (zero) output as desired.

The parasitic capacitance "Cp" is annotated in FIG. 3. The parasitic capacitance Cp represents the residual parasitic capacitance of the SC cell 350 when all SC (that is, the CN) are switched out.

Figure 4A:
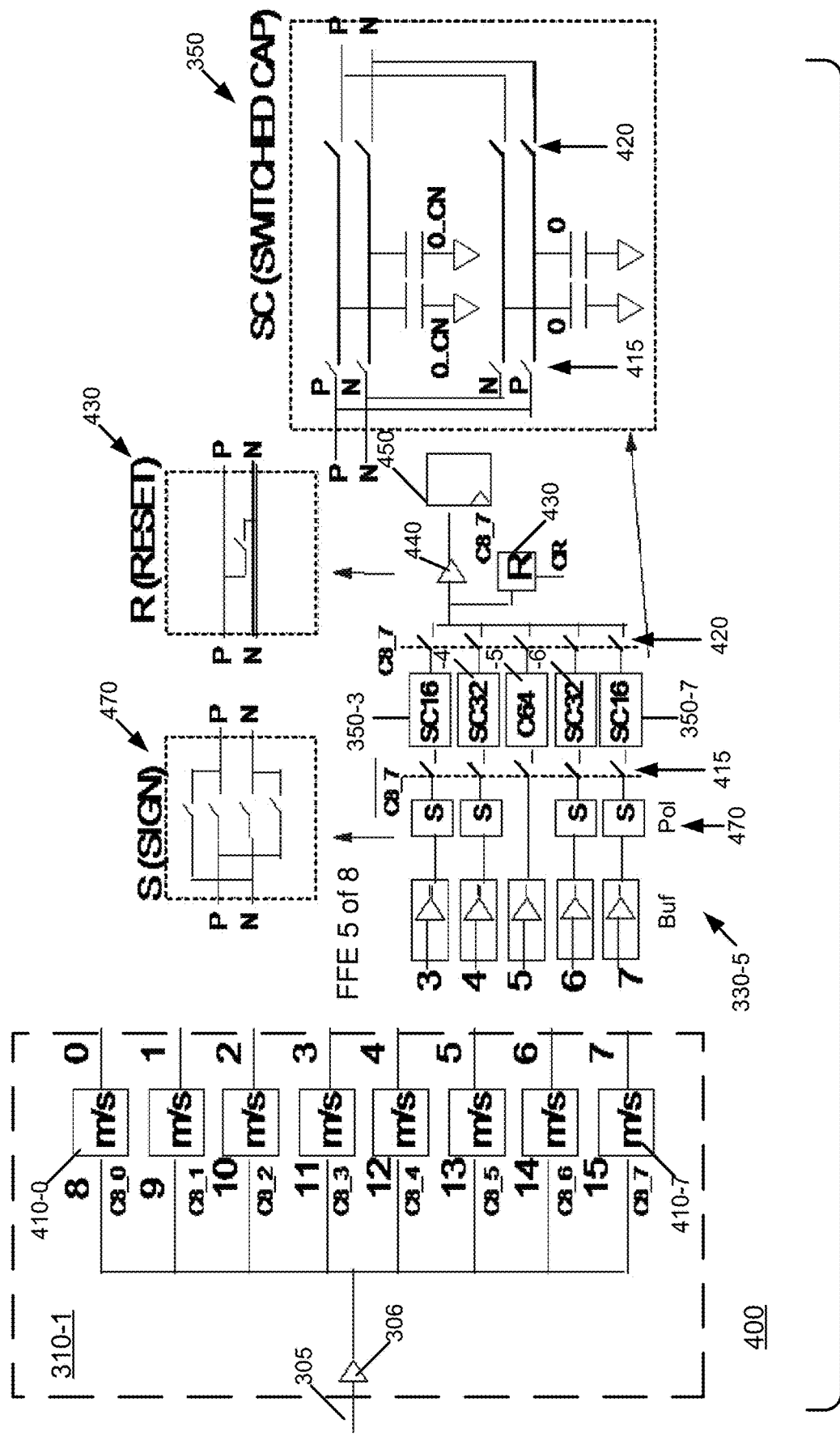
FIG. 4A illustrates an example embodiment of a 5-tap Rx SCFFE and corresponding details.
Figure 4B:
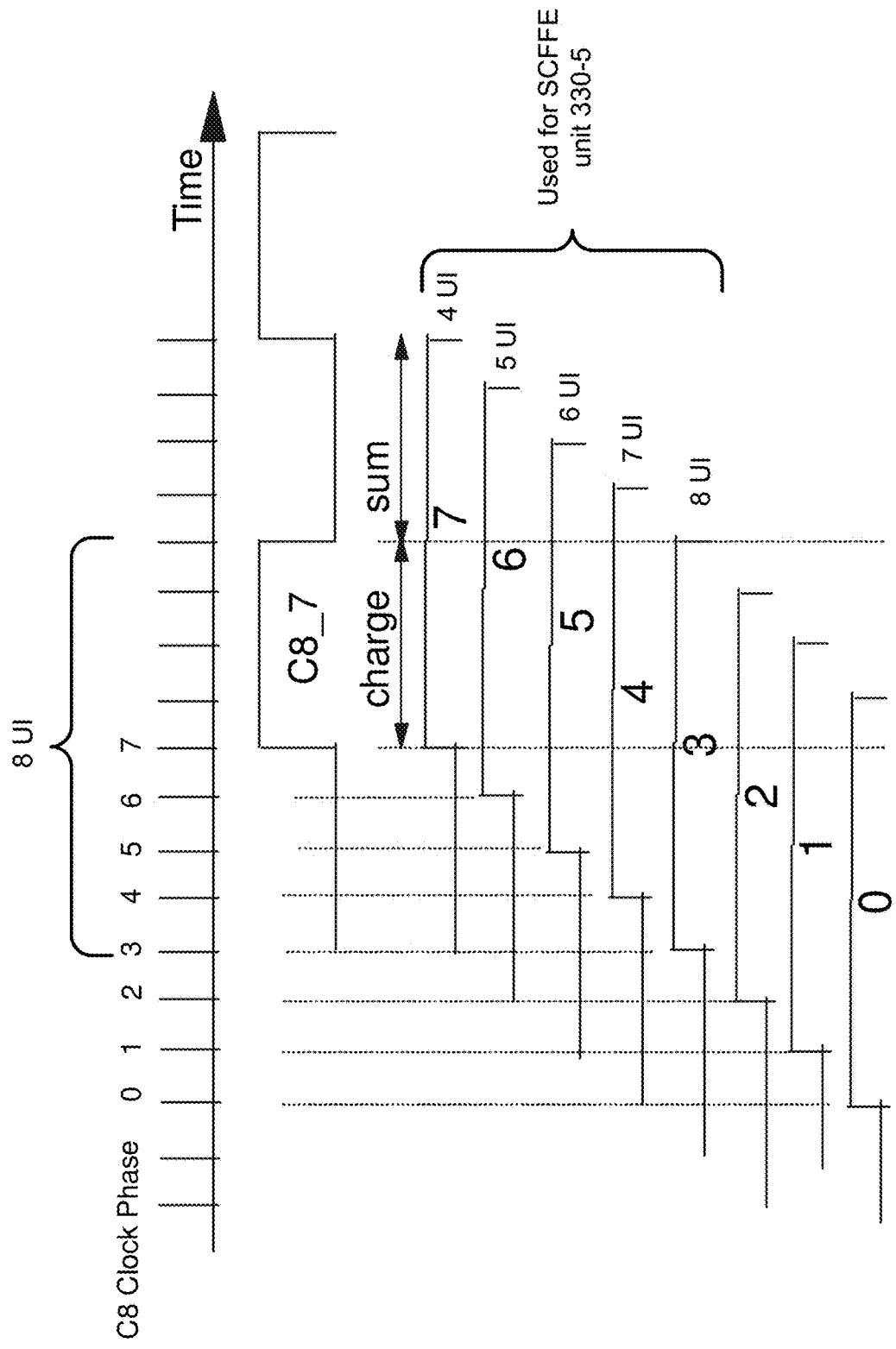
FIG. 4B illustrates a timing diagram indicating that the arrangement in FIG. 4A is able to charge master-slave output phases 3, 4, 5, 6, and 7 in parallel.
Figure 4C:
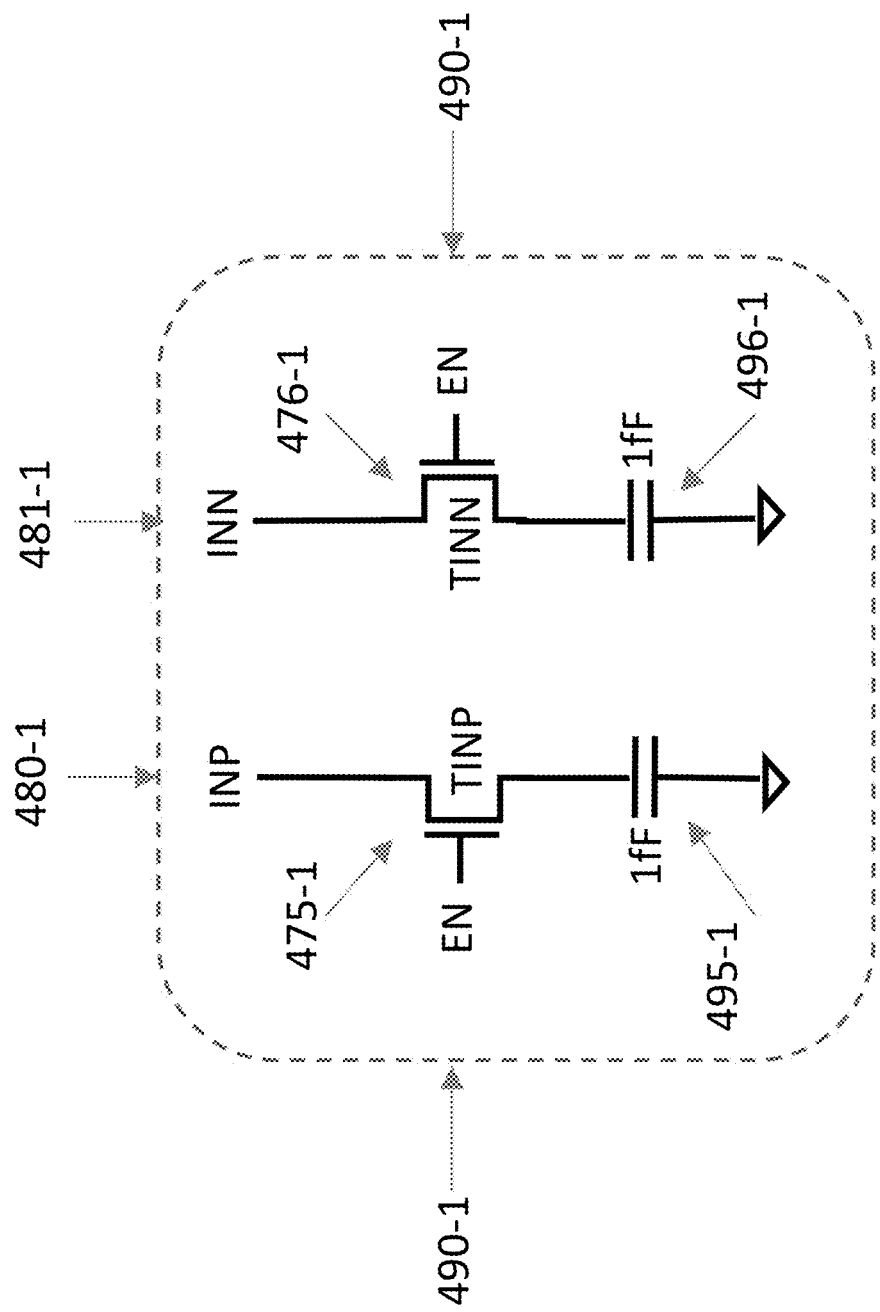
FIG. 4C illustrates examples of P and N paths, each with a 1 fF unit SC, for a switched capacitor cell.
Figure 4D:
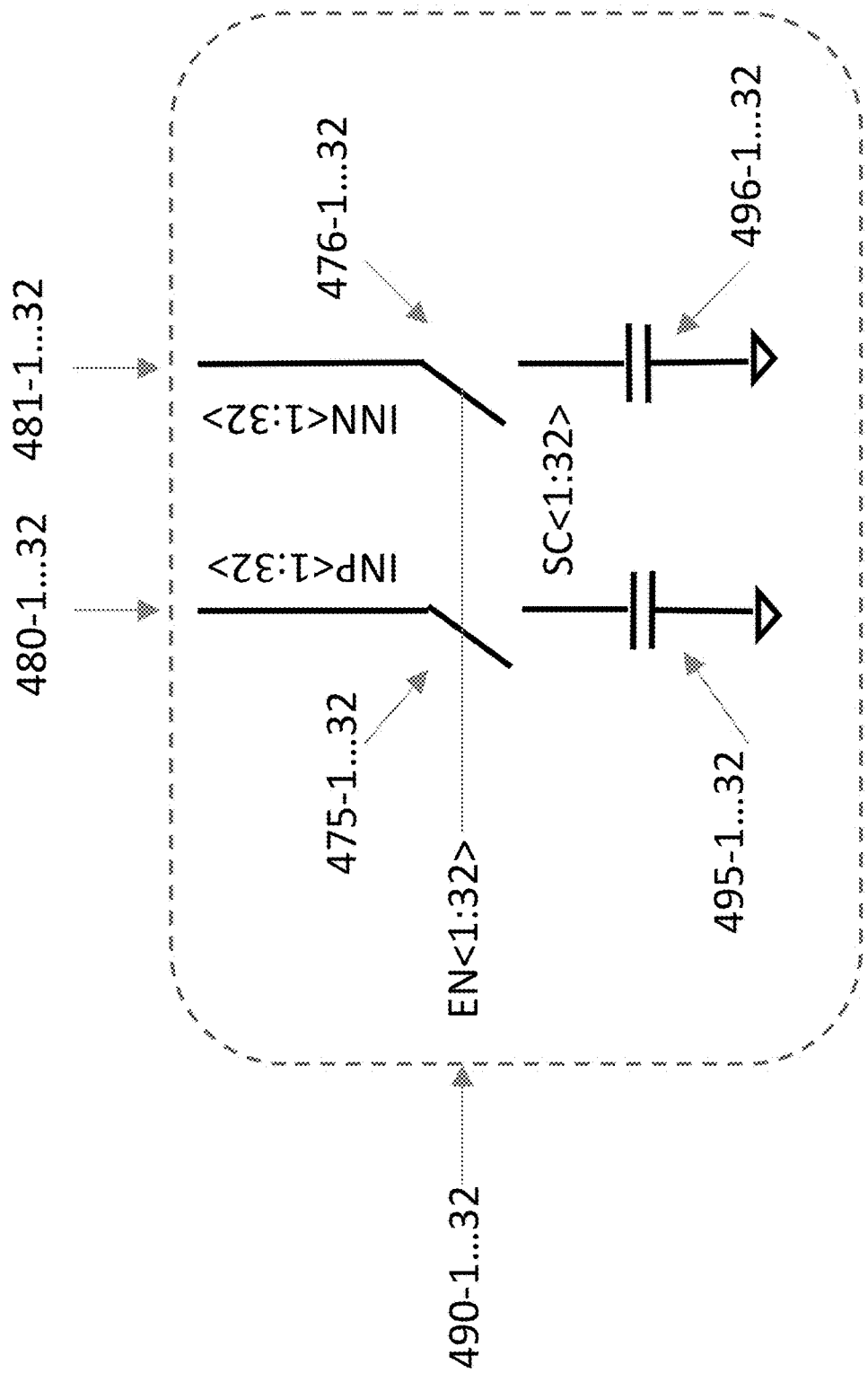
FIG. 4D illustrates one section of an SC32 cell (as in FIG. 4A) to represent a 1st postcursor.
Figure 4E:
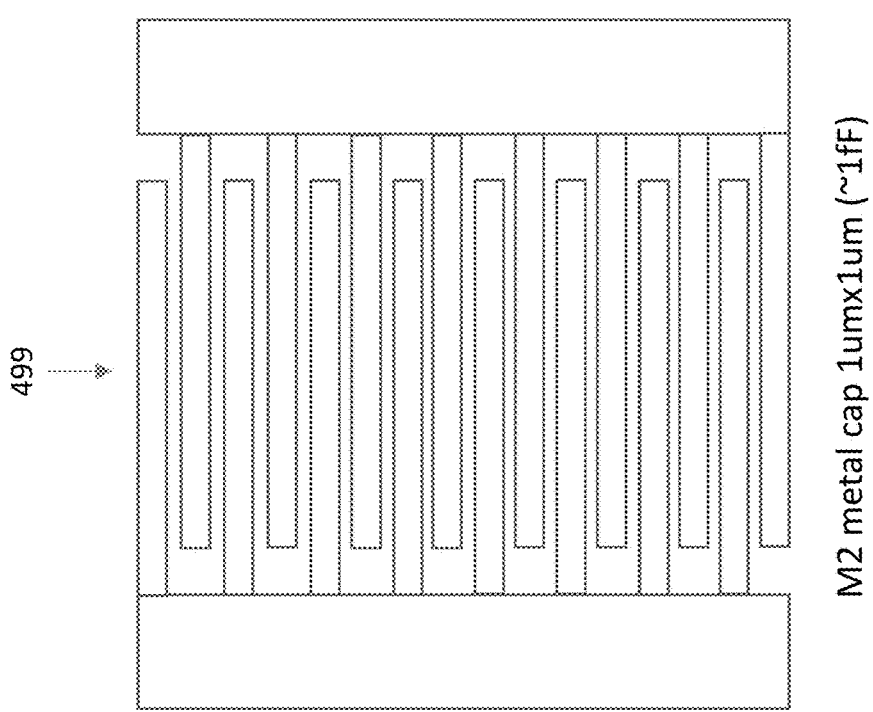
FIG. 4E illustrates exemplary M1 & M2 metal capacitors.
Figure 4E:
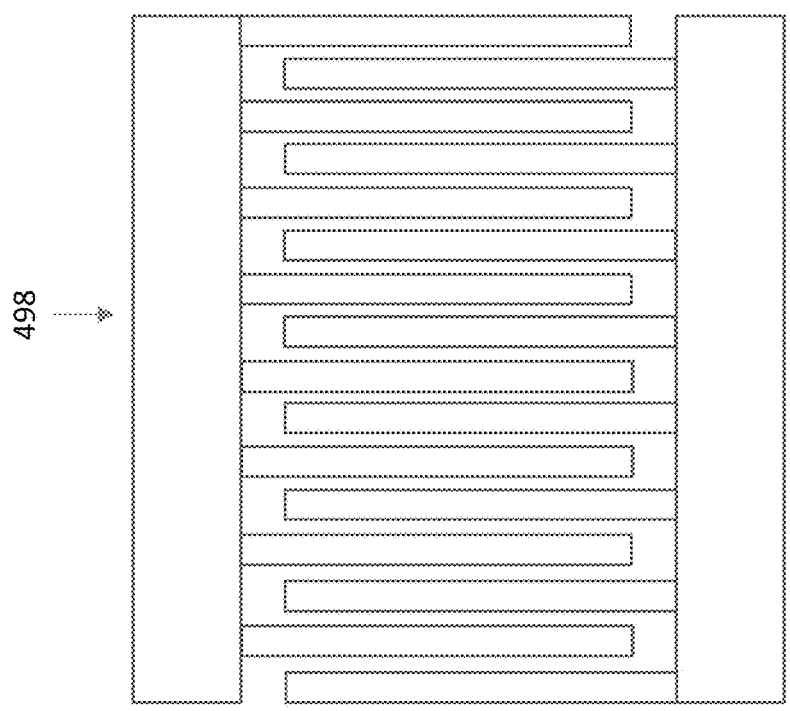

Each SCFFE unit 330 in an exemplary embodiment comprises NFFE SC cells 350. Each SC cell 350 in turn realizes a variable capacitance ranging from 0 (zero) to some maximum capacitance Cmax, where the Cmax for each cell may vary in certain embodiments. FIGS. 4C-4E describe one way to achieve capacitances from 0 (zero) to some maximum capacitance Cmax, which is to have a maximum number of capacitors of CN, each having the same capacitance (though it is possible some of the capacitances could be different) and be able to switch these capacitors into or out of the circuit. As an example, for a 5-tap FFE Cmax for the center tap may be set at 64 fF (femto-Farads), while Cmax for the pre-cursor and post-cursor taps might be set at 32 fF and the second pre- and second post-cursor taps may be set to 16 fF. In an exemplary embodiment in modern CMOS technology, the switched cap resolution will be approximately 1 fF per step for all SC cells.

The control circuitry 390 is circuitry configured to control operation of the feed-forward equalizer circuit 300, such as controlling operation for one or more of the sub-sampler 310 and/or the clock generator 320, and/or controlling the gain (e.g., as a gain control signal) of the variable gain amplifiers 340.

Further detailed description will be given to clarify possible operation. For this description, an example embodiment which realizes a 5-tap FFE with a subsample rate N=8 will be used. As illustrated in FIG. 4A, which shows an example embodiment of a 5-tap Rx SCFFE 400 and corresponding details, a bank of 8 differential master/slave (m/s) samplers 410-0 through 410-7 (as part of sub-sampler 310-1, which is an example of sub-sampler 310 of FIG. 3) are used to sample a received data signal (after amplification by amplifier 306) where each sampler is clocked at ⅛ (one-eighth) the symbol rate of the incoming data in received signal 305. The master-slave samplers 410 drive 8 SC-FFE circuits 330 which realize the FFE function. In FIG. 4, a single phase 330-5 (FFE 5 of 8) of a 5-tap FFE structure 330 is shown for illustrative purposes. The other eight phases, each with 5 taps, are not illustrated.

With reference to FIGS. 3 and 4A, there are 8 total SCFFE realized when N=8. The subsample inputs (see the "Subset (0)" through "Subset (N−1)" in FIG. 3) are as follows:

SCFFE0: Inputs 6,7,0,1,2;
SCFFE1: Inputs 7,0,1,2,3;
SCFFE2: Inputs 0,1,2,3,4;
SCFFE3: Inputs 1,2,3,4,5;
SCFFE4: Inputs 2,3,4,5,6;
SCFFE5: Inputs 3,4,5,6,7 (shown on FIG. 4A)
SCFFE6: Inputs 4,5,6,7,0; and
SCFFE7: Inputs 5,6,7,0,1.

The equation for these inputs (for 5 taps) is as follows:
Inputs for SCFFEi: $(i-2)\% N\ (i-1)\% N\ i\ (i+1)\% N\ (i+2)\% N$,
where i is the SCFFE bank, the % symbol means modulo, the cursor position is normally defined as I, and indexes less than i are precursors and indexes greater than i are postcursors. Looking at the SCH-th from FIG. 4A, i=5 and N=8, and therefore the inputs according to the above equation are: (5-2)%8 (5-1)%8 5 (5+1)%8 (5+2)%8=the 3, 4, 5, 6, 7 shown above. For SCFFE0, (0-2)%8 (0-1)%8 1 (1+1)%8 (2+2)%8=the 6,7,0,1,2 shown above. One way to think of this is via a circular buffer, such that (0-1)%8=−1, which means one starts at zero and goes backward via the circular buffer to 7.

In FIG. 4A, this phase 330-5 of the FFE structure 330 first buffers (buf) the master/slave sampler outputs 3-7, then drives (or may drive) a sign switch (S) 470, shown also as Pol, which can flip the sign of the differential data to 1 (one) or −1 (negative one) on FFE taps other than the main (5) or "cursor" tap, which normally does not have a sign switch, but may also if desired. One possible sign switch 470 is shown in more detail in the upper part of FIG. 4A. The output of the sign switch drives a bank of switched capacitors (SCs, with SCs 350-3 through 350-8, although complete reference numerals for only 350-3 and 350-7 are shown and the other reference numerals are shorted to "-4", "-5" and "-6" due to a lack of space), which may be switched in or switched out (via switches 415, 420) depending on the desired weight of the FFE tap. Note that this example has the C8_7 clock being high (see FIG. 4B too, although FIG. 4A shows the C8_7 with a bar above it for indicating the high signal) closing the switches 415 and connecting the sign switches 415 to the capacitors in the SC cells 350-3 through 350-7, and the C8_7 being low (see FIG. 4B too, although FIG. 4A shows the C8_7 without a bar above it for indicating the low signal) closing the switches 420 and connecting the outputs of the SC cells 350-3 through 350-7 to the amplifier 440. These switched capacitors may be constructed with metal vertical natural capacitors (VNCAPS) or Metal-Oxide-Semiconductor capacitor (MOSCAP) structures that are well known. A typical switched capacitor will have a small unit value, such as 1 fF. The capacitor will be connected to the charge path with a CMOS passgate switch if it is desired to be part of the charge weight, or disconnected otherwise. In a typical embodiment realizing a 5-tap FFE 330, the main or cursor tap (350-5) will contain ~64 switchable unit capacitors, first pre- and post-cursor taps (350-4 and 350-6) will contain ~32 switchable unit capacitors, and second pre- and second post-cursor taps (350-3 and 350-7) will contain ~16 switchable unit capacitors to provide adequate tap weight resolution and range.

The 0 . . . CN (variable capacitors) on FIG. 4A (see also FIG. 3) represents multiple caps in parallel and each of them can be enabled and disabled to reflect a corresponding FFE tap weight, thus there is a switch (such as a switch FET, see FIG. 4C for instance) in series with each 0 . . . CN cap to enable or disable the corresponding cap. Assume for a particular channel, the second (2nd) postcursor=0 turns out to be the best equalization setting for the 5-tap FFE. All of the 0 . . . CN caps are disabled, meaning its corresponding series 0 . . . CN switch is open. The 0 . . . CN caps are not seen as charging caps anymore, but the disabled series switches would still contribute parasitic device cap (e.g., diffusion and overlap capacitances) which are still seen as charging caps. In other words, 0 (zero) weight on the 2nd postcursor is not really 0 weight due to parasitic device cap of the series switch. That is where the 0 cap (the other path on FIG. 4A) comes into the picture to make an effective 0 weight on the 2nd postcursor. The 0 cap means 0 to N switches, but each switch is in series with a 0 cap (physically no need of having any actual cap there), however the polarity of the parasitic device cap from the series switches is the opposite to the series switches in series to 0 . . . CN caps, hence effectively canceling out charges. The same exact copy of 0 . . . CN caps can be placed at the place of 0 caps, and this will achieve more accuracy in near-zero capacitance, but it is likely an ineffective use of silicon area.

By using a sub-rate sampling architecture of 8, 4 clock cycles are available to charge the switched-capacitor bank and 4 cycles are available to sum the charged capacitors to form the FFE equalized result. The timing diagram in FIG. 4B illustrates that the arrangement is able to charge master-slave output phases 3, 4, 5, 6, and 7 in parallel, at the same time for the SCFFE unit 330-5, without requiring any extra hold sampler on the master-slave output signals. In some embodiments, straightforward extension of the FFE range may be achieved by adding extra hold samplers after the master-slave sampler outputs to create needed delays to input to an extended range FFE. The 5-tap FFE structure does not require any extra data hold samplers. Therefore, the 5-tap structure is recommended in an exemplary embodiment, with 2 precursors and 2 postcursors. Use of a 4-4 time interval split for the charge and sum phases simplifies clock generation in the system and minimizes current required in the buffers to charge the capacitors.

The timing diagram in FIG. 4B further illustrates that due to 8UI holding nature at the master/slave sampler outputs 3-7, each of the 5 FFE taps has a different available charging time. The UI is a Unit Interval, which is the time duration of a data symbol on the line. The second (2nd) postcursor has 8UI available charging time while the first (1st) postcursor, cursor, 1st precursor, and 2nd precursor have 7UI, 6UI, 5UI and 4UI respectively. See the corresponding indications on FIG. 4B. The labeled 4UI charging time and 4UI summing time on the particular master/slave sampler output 7 in FIG. 4B is the least available charging time path (the 2nd precursor path) among all 5 FFE taps. Because the combined power from the 5 Bufs in the structure 330-5 and the 8 master/slave buffers in the structure 400 in FIG. 4A is a major contributor to total power for the 5-tap FFE design, it is possible to take advantage of the extra available charging time on the 2nd postcursor, 1st post cursor, cursor and 1st precursor in order to effectively reduce power consumption. Different available charging time would allow each of the 5 Bufs in the structure 330-5 in FIG. 4A to be designed and sized accordingly in strength to meet the common desired 1% settling time requirement during the charging phase. More available charging time means less driving strength required by the Bufs in the structure 330-5, hence less power proportionally. The downsize of the 5 Bufs in the structure 330-5 would in turn lead to downsize of the 8 master/slave buffers in the structure 400 to further reduce power.

A differential reset 430 (R block in FIG. 4A) is placed on the sum node of the SC bank in an exemplary embodiment. This differential reset 430 is shown as an example in the upper portion of FIG. 4A and is asserted during the charge phase and released during the sum stage. This is used to clear the charge out for the next FFE sum from the previous FFE sum.

The sum node output in an exemplary embodiment is amplified by an amplifier 440, which may have a variable gain as a function of the FFE tap indexes associated with a corresponding one of the SCFFE units 330, to provide a suitable output level to following decision latches 450.

A problem with the SC switches arises due to parasitic capacitances in the switch devices which connect the unit capacitors. In particular, there is no way to configure the charge capacitance on any given FFE tap to 0 (zero), since even if all unit caps are switched out, the parasitic switch capacitance remains. This problem is solved in exemplary embodiments herein by passing a differentially inverted data signal through a "dummy" SC bank which always has all its unit caps switched out, to match the parasitic capacitance of the switchable SC bank. See FIG. 3, where the parasitic capacitance "Cp" is shown and the "dummy" SC bank has the zero (0) values of capacitance. This technique effectively cancels the effect of the parasitic capacitance in the summed output, enabling a tap weight of 0 (zero) to be realized on any given FFE tap. The main cursor tap is normally not required to achieve a tap weight of 0 (zero), so the dummy SC bank is not required on the main cursor.

Turning to FIG. 4C, this figure illustrates examples of P and N paths, each with a 1 fF unit capacitor, for switched capacitor cell 350 as illustrated in FIG. 4A. In this example, the 0 . . . CN of FIG. 4A is 1 to 32, one P path 480-1 and one N path 481-1 is illustrated, which occur in the paths marked as 0 . . . CN in the SC cell 350 and in specifically the SC32 cell 350-6 of FIG. 4A. The P path 480-1 (shown also with a signal INP) comprises a transistor TINP 475-1 and a 1 fF capacitor 495-1. The N path 481-1 (shown also with a signal INN) comprises a transistor TINN 476-1 and a 1 fF capacitor 496-1. VSS may be considered to be a ground signal connection. Both the transistors 475-1 and 476-1 are controlled by a single enable (EN) signal 490-1. For instance, a high voltage on the EN signal 490-1 turns on the transistor (e.g., shuts the switch) and a low voltage on the EN signal 490-1 turns off the transistor (e.g., opens the switch).

FIG. 4D illustrates one section of an SC32 cell 350-6 (as in FIG. 4A) to represent a 1st postcursor. There are 32 enable signals, illustrated as EN<1:32>490-1 . . . 32. There are 32 P paths 480-1 . . . 32, illustrated as NIP<1:32>, and 32 N paths 481-1 . . . 32, illustrated as INN<1:32>. There are 32 1 fF capacitors 495-1 . . . 32 in the 32 P paths 480-1 . . . 32 and 32 1 fF capacitors 496-1 . . . 32 in the 32 N paths 481-1 . . . 32. The transistors 475 are illustrated as 32 switches 475-1 . . . 32, and the transistors 46 are illustrated as 32 switches 476-1 . . . 32. Each of the enable signals 490 enables (or disables) both a corresponding one of the P switches 475 and one of the N switches 476. In other words, both the P and N paths have a "starting" transistor (#1 of 32), and the first enable signal EN1 495-1 enables (or disables) both of these transistors at the same time. The switches 475, 476 allow different (sets of) capacitors 495, 496 to be selected in accordance with different tap weights for optimal equalization/performance, as previously described. Operation for the other 31 switches and capacitors is similar.

Referring to FIG. 4E, this figure illustrates example M1 & M2 metal capacitors. As is known, M1 and M2 refer to metal layers in an integrated circuit. This figure illustrates a 1 fF metal cap on M1 and another 1 fF on M2. If one wants to reduce the area, the M1 and M2 metal caps can be tied together and this will reduce the area by half to achieve the same 1 fF. One can implement the metal cap on another lower level metal too, like M3 and so on. Also this schematic cap illustration is a single-ended cap (i.e., the cap is with respect to ground), but it is possible to use a differential cap too (for this implementation, put the cap in between the P and N paths with half size because the cap is differential).

The SC capacitors may be either differential or single-ended, as shown in FIG. 5. FIG. 5 is split into FIG. 5A, illustrating a differential switched capacitor (cap), and FIG. 5B, illustrating a single-ended switched cap, in accordance with exemplary embodiments. The advantage of the differential structure in FIG. 5A is that this structure requires less area to create differential capacitance, but the differential structure may be harder to realize depending if the unit caps are constructed from MOS devices or metal structures (VNC caps). If a differential cap structure is feasible to use in the target technology, the "vboost" switch cell 600 shown in FIG. 6 may be used. In this case, the unit caps are charged (via the CCharge and corresponding switches) in parallel and summed (via the CSum and corresponding switches) in series to provide a voltage boost to the summed output 610.

Figure 7:
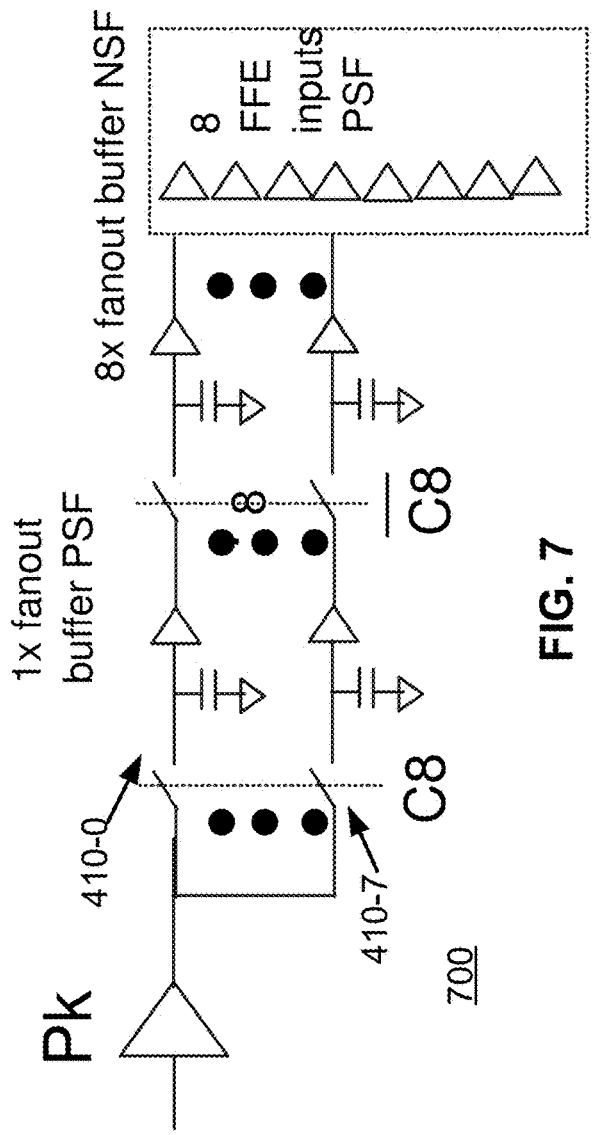
FIG. 7 illustrates an example of a multi-phase master-slave sampler.

FIG. 7 shows a detailed diagram of a typical multi-phase master/slave sampler 700. The multi-phase master-slave sampler 700 is configured to sample the data signal and to generate sample outputs nominally equal in duration to a sub-rate sample period of the sub-rate phases, due to edge boundary effects on the M/S sampler. This example uses multiple master/slave samplers 410-0 through 410-7 (see FIG. 4), which are themselves an example of part of the sub-sampler 310-1 (see FIG. 4). Each of the master/slave samplers 410-0 through 410-7 can be considered one of the multiple phases. This structure illustrated in FIG. 7 is well known. The multi-phase master/slave sampler 700 has eight individual master/slave samplers 410-0 through 410-7. The multi-phase master/slave sampler 700 requires two buffers and two sampler stages to realize a sampled output signal which is valid for the nominal duration of the subsample rate (in the example case, 8 symbol interval clocks, illustrated by "C8"). There is a 1× (one times) buffer PSF (P-type source-follower) and an 8× (eight times) fan out buffer NSF (N-type source-follower). The 8× fan out buffer feeds 8 FFE inputs PSF. The C8 signals control the corresponding switches shown (and the C8 signals may be controlled by the control circuitry 390).

Figure 8:
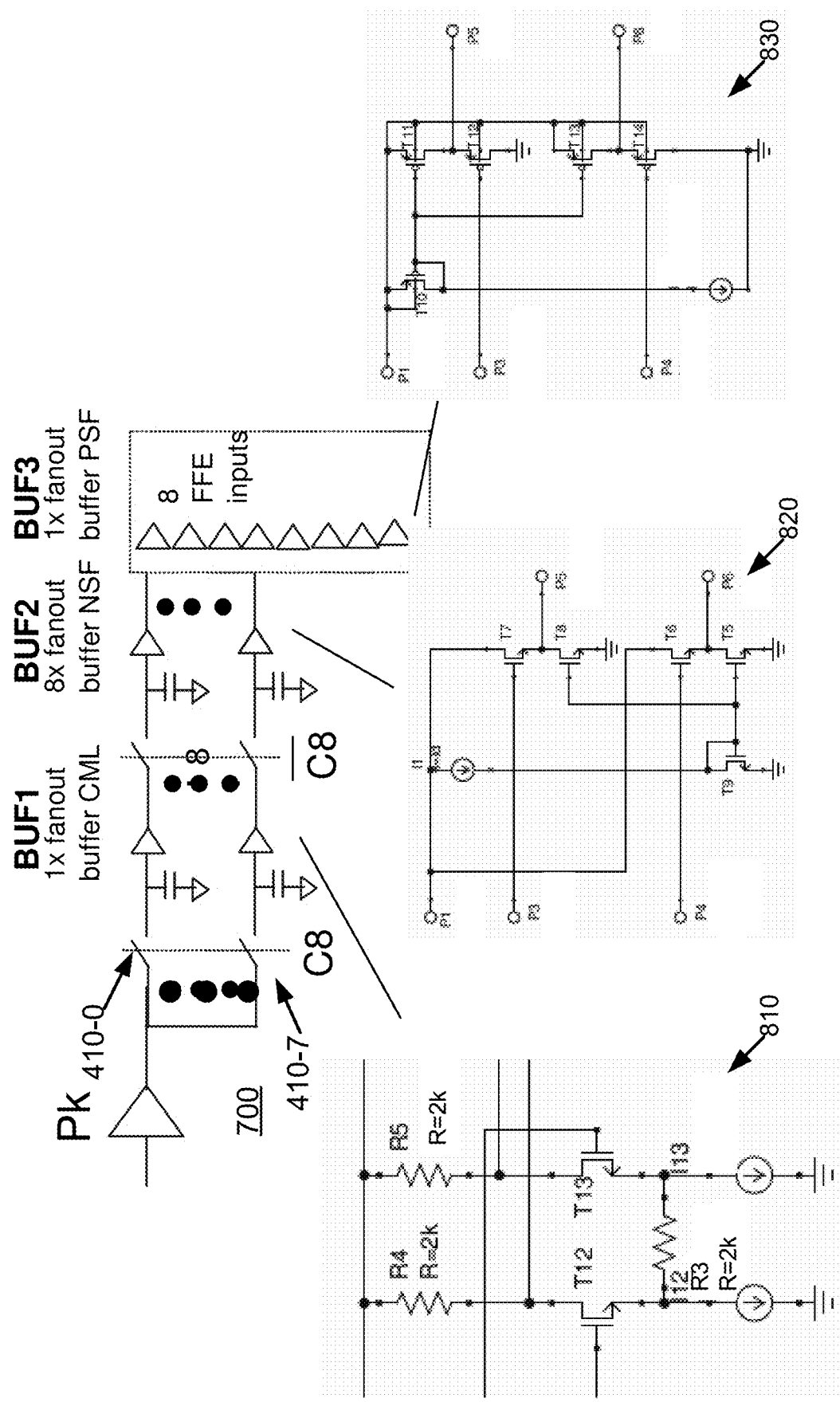
FIG. 8 illustrates example circuits for a multi-phase master/slave sampler and corresponding SCFFE voltage buffers.

FIG. 8 shows typical circuits which may be used to realize the multi-phase master/slave sampler 700 and corresponding voltage buffer driver in the SC cell. The circuits are common current mode logic (CML) amplifier stages and source-follower stages that are well known in the art. In this example, the first buffer (BUF1) is a 1× fan out buffer implemented using CML, the second buffer (BUF2) is an 8× fan out buffer implemented using NSF, and the third buffer is a 1× fan out buffer implemented using PSF and having 8 FFE inputs. The third buffer, that is, is the voltage buffer driver in the SC cell. Exemplary circuits to implement the buffers are illustrated. Circuit 810 is used for the first buffer (BUF1); circuit 820 is used for the second buffer (BUF2); and circuit 830 is used for the third buffer (BUF3). It is noted that the numbers that follow the R (for resistor) or T (for transistor) or other circuit diagram symbols may not be indicative of the number of the elements for the circuit shown. For instance, the circuit for BUF1 has two resistors that are marked as R4 and R5, although there are only two resistors in that circuit.

Figure 9:
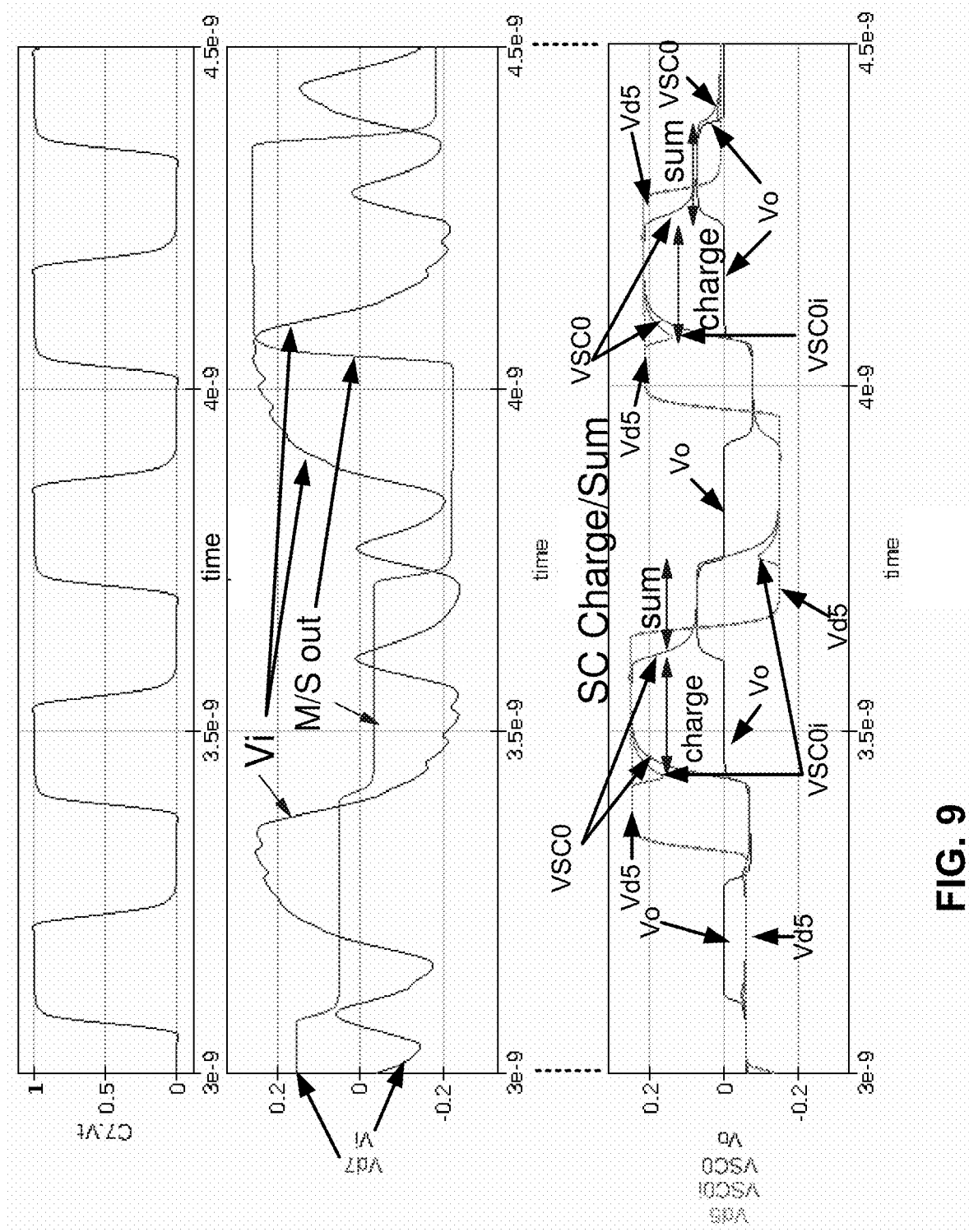
FIG. 9 shows example sampling waveforms for one of the FFE banks for a nominal 50-50 split of charge versus sum time.

FIG. 9 shows example sampling waveforms for one of the FFE banks for a nominal 50-50 split of charge versus (vs) sum time. This split is chosen to simplify clock generation in the system and give sufficient time to charge the capacitances without requiring large current drive from the buffer amplifiers.

In more detail, FIG. 9 illustrates the sampling of an input waveform at a subsample rate and the charge and sum phases of the SC cell. The C7.Vt is a C8 clock. The Vi is an example band-limited waveform input to the receiver 301. The Vd7 is the sample-and-held (subsampled value) output from a master-slave sub-sampler phase, overlapping in time with the cursor sub-sample Vd5 . . . VSCOi is the voltage buffered sampled waveform. VSCO is the voltage on the SC capacitor node. Vo is the voltage on the output sum node after the passgate output switches. One can see there are non-zero rise and fall times of the M/S output as this output transitions from one sample to the next. Therefore the waveform takes non-zero time to settle to its new held output value at the start of the hold time due to inherent bandwidth limitations in the CMOS circuits. Ideally, the M/S outputs a held sample equal to the time duration of the sub-sample rate period, but the non-zero settling time causes a held sample time slightly different from the time duration of the sub-sample rate period.

Figure 10:
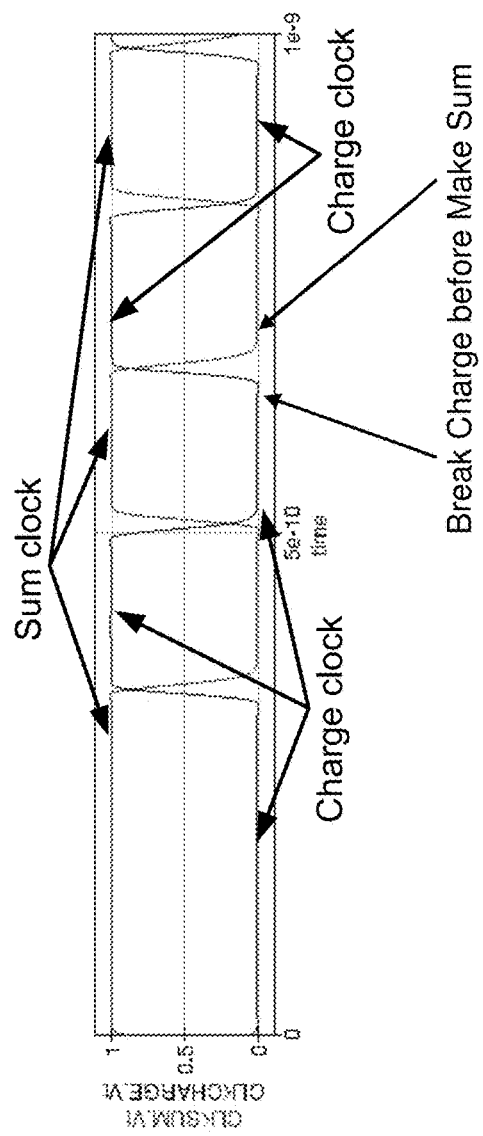
FIG. 10 illustrates charge and sum clocks for an SC cell.

FIG. 10 illustrates details of the charge and sum clocks for a SC bank. The charge clock breaks (disconnects) slightly before the sum clock makes (connects) to ensure an accurate SC sum.

Figure 11A:
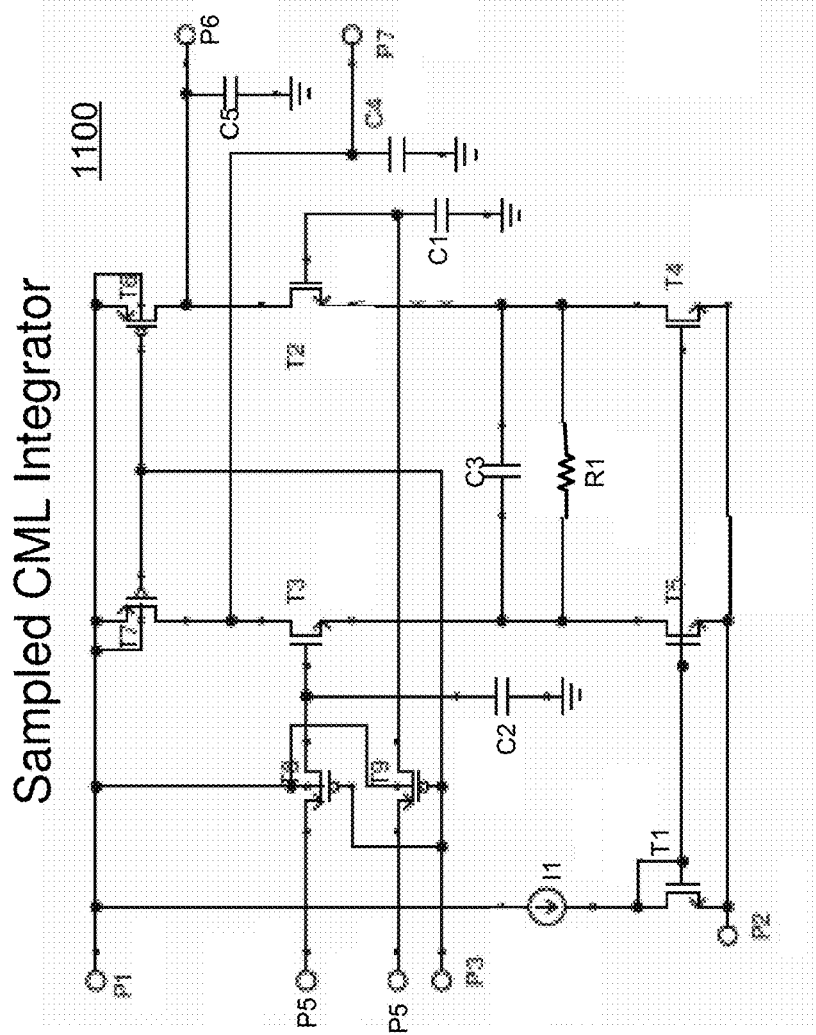
FIG. 11A illustrates an example gain buffer for SCFFE output amplification.

FIG. 11A shows a realization of a circuit to amplify the output of the SC equalizer. This is an example gain buffer for SCFFE output amplification, as can be used in the gain amplifiers 340 of FIG. 4. This circuit 1100 is a sampled CML integrator, which is well known in the art as a method to achieve high gain with low bias current. The gain can be easily varied by changing bias current or tail resistance of the sampled CML integrator.

Figure 11B:
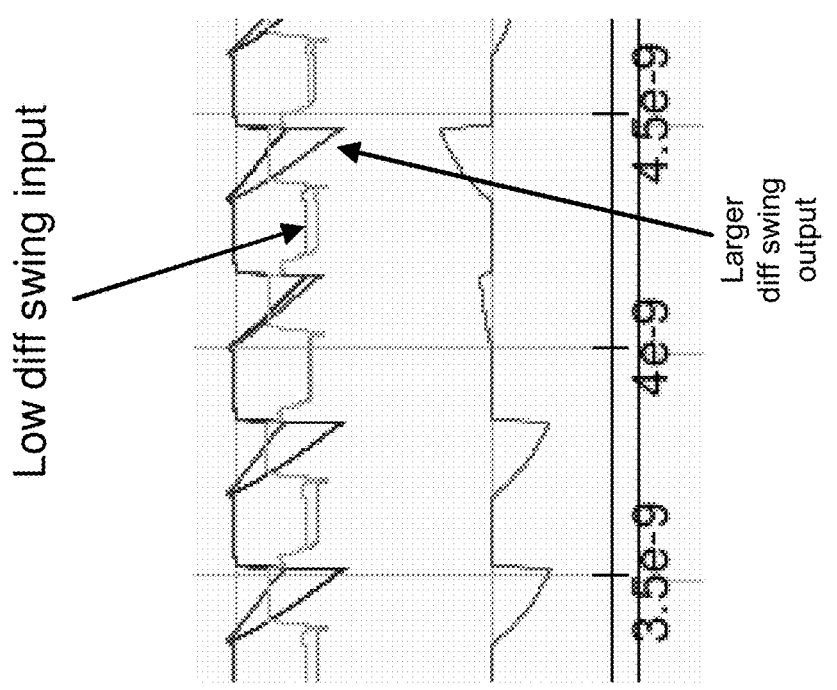
FIG. 11B shows waveforms in the example gain buffer for SCFFE output amplification of FIG. 11A.

Referring to FIG. 11B, this figure shows waveforms in the example gain buffer for SCFFE output amplification of FIG. 11A. A low differential (diff) swing input is illustrated. FIG. 11B illustrates amplification of a differential signal output by the SCFFE using the sampled integrator. A small differential swing input waveform is amplified to a larger differential swing output waveform. The VGA function realized with a sampled integrator is only an example, other methods to realize the VGA function could use a non-sampled current-mode logic (CML) buffer well known in the art.

Advantages of the described exemplary embodiments over known methods include, but are not limited to, one or more of the following:

1) Certain exemplary embodiments provide receiver FFE function without the need for a digital-based receiver, potentially lowering power of the design.

2) Compared to an integrating analog FFE the proposed exemplary SC solution is less sensitive to clock jitter, since the SC solution is only dependent on the signal getting fully charged in the charge state. The exact time of entering charge state or sum state therefore has a negligible effect on the tap weights at the sum node output. Further, the proposed SC structure is inherently able to achieve accurate deterministic tap weights in the FFE, since the weights are based on capacitance ratios, which are well controlled in modern CMOS processes.

3) Exemplary embodiments may use an extremely simple clocking scheme based on an efficient two-phase SC cell clock timing, requiring only a sum and charge clock phase. Only one set of C8 clocks needs to be generated for the global SCFFE realization, simplifying clock distribution.

4) Exemplary embodiments provide an accurate 0 (zero) or low tap level using an SC cell with built-in parasitic cancellation. The 0 (zero) or low tap levels may become more inaccurate in integrator based analog FFE at very low bias currents due to non-linear effects.

5) Exemplary embodiments automatically align to the period of the incoming data based on the sampling clock, avoiding the need to implement a variable-delay function as would be needed with a transversal FFE based on analog delay cells.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An apparatus, comprising:
a feed-forward equalizer circuit, comprising:
a clock generator creating multiple sub-rate phases of an input clock;
a multi-phase sampler responsive to a data signal and to the multiple sub-rate phases generated by the clock generator, the multi-phase sampler configured to sample the data signal and to generate respective held sample outputs corresponding to the multiple sub-rate phases;
a switched-capacitor equalization circuit having two states and responsive to outputs from the multi-phase sampler and the clock generator, where the two states are charge and sum, and the switched-capacitor equalization circuit is configured to form outputs using the two states, wherein the switched-capacitor equalization circuit comprises a plurality of switched capacitor cells in parallel and coupled to respective ones of the outputs of the multi-phase sampler, wherein at least one of the plurality of switched capacitor cells has first and second paths that are cross-connected to opposite ones of the first and second paths, and wherein each of the first and second paths comprises one or more capacitors and corresponding switches, the switches configured to charge the one or more capacitors in the first and second paths, the charging responsive to a charge signal used in the charge state from a corresponding one of the sub-rate phases, and the switches configured to cause summing of outputs from the one or more capacitors in the first and second paths, the summing responsive to a sum signal used in the sum state from the corresponding one of the sub-rate phases; and a variable gain output stage responsive to the outputs from the switched capacitor equalization circuit and responsive to at least one gain control signal to provide variable gains to corresponding outputs of the switched-capacitor equalization circuit to form equalized outputs based on the data signal.

2. The apparatus of claim 1, wherein the at least one of the plurality of switched capacitor cells that has first and second paths that are cross-connected to opposite ones of the first and second paths forms a switched-capacitor circuit configured to enable a zero tap weight and to cancel parasitic capacitances in the first and second paths.

3. The apparatus of claim 2, wherein the switched-capacitor circuit of the at least one switched capacitor cell comprises a plurality of capacitors and switches in series with corresponding ones of the plurality of capacitors to enable capacitances from 0 (zero) to Cmax for the first and second paths and wherein cross-connected paths have capacitances of zero, and the switched-capacitor circuit comprises first and second sets of additional switches in the first and second paths, wherein the first set of additional switches is responsive to the charge signal used in the charged state to cause charging of capacitors in the first and second paths when the first set of additional switches are closed and the second set of additional switches are open, and wherein the second set of additional switches is responsive to the sum signal used in the sum state and causes discharging of the capacitors in the first and second paths when the second set of additional switches are closed and the first set of additional switches are open.

4. The apparatus of claim 3, wherein there are N capacitors in the plurality of capacitors, and each of the N capacitors has a same capacitance.

5. The apparatus of claim 3, wherein the plurality of switched capacitor cells are at different tap indexes corresponding to individual ones of the multiple sub-rate phases, wherein total capacitance of a corresponding one of the plurality of switched capacitor cells varies as a function of the tap index.

6. The apparatus of claim 1, wherein at least one of the plurality of switched capacitor cells comprises a voltage boost switched-capacitor circuit configured with multiple capacitors charged in parallel during the charge state but discharged in series during the sum state.

7. The apparatus of claim 1, wherein the variable-gain output stage comprises a plurality of variable-gain amplifiers responsive to at least one gain control signal and configured to maintain a desired signal level, wherein cell tap weights in the switched-capacitor equalization circuit are varied according to a channel being equalized.

8. The apparatus of claim 1, wherein the plurality of switched-capacitor cells correspond to different delays caused by the multiple sub-rate phases with individually programmable capacitance weights and the outputs of which are connected together to form a weighted sum of delayed versions of the sampled data signal to realize a feed-forward equalization function.

9. The apparatus of claim 8, wherein the plurality of switched-capacitor cells comprise passgate switches configured for the charge state during a nominal first one-half of a sub-rate sample period.

10. The apparatus of claim 8, wherein the clock generator creates N uniform sub-rate phases of the input clock, wherein the switched-capacitor equalization circuit comprises N parallel units, each of the N parallel units comprising one or more of the plurality of switched-capacitor cells.

11. The apparatus of claim 10, wherein the N parallel units have different sets of tap indexes as inputs, each tap index corresponding to an individual ones of the multiple sub-rate phases, and wherein a combined output for at least one of the N parallel units is amplified by an amplifier having a variable gain as a function of the tap indexes for the at least one parallel unit.

12. The apparatus of claim 1, and wherein the feed-forward equalizer circuit comprises at least one polarizer prior to a corresponding at least one of the plurality of switched capacitor cells, the at least one polarizer is configured to assign a polarity to a signal entering the corresponding at least switched capacitor cell.

13. The apparatus of claim 1, wherein the clock generator creates N uniform sub-rate phases of the input clock as the multiple sub-rate phases.

14. The apparatus of claim 13, wherein subsampling ratio N is selected to provide adequate charge time in the charge state and sum time in the sum state for the plurality of switched-capacitor cells.

15. The apparatus of claim 1, further comprising a receiver comprising the feed-forward equalizer circuit.

16. The apparatus of claim 1, further comprising control circuitry configured to cause the clock generator to create the multiple sub-rate phases and to cause the variable gain output stage to apply one or more variable gain control signals to outputs from the switched capacitor equalization circuit.

17. The apparatus of claim 16, further comprising a receiver comprising the feed-forward equalizer circuit and the control circuitry.

* * * * *